United States Patent [19]

Magauran et al.

[11] Patent Number: 5,340,390
[45] Date of Patent: Aug. 23, 1994

[54] RHEOLOGICAL ADDITIVE COMPRISING DERIVATIVES OF CASTOR OIL

[75] Inventors: Edward D. Magauran, Westampton; William Reynolds, Barnegat; Lawrence DiCarlo, Hamilton Sq.; Charles A. Cody, Robbinsville; Araxi Chiavoni, Trenton; Modasser El-Shoubary, Robbinsville, all of N.J.

[73] Assignee: Rheox, Inc., Hightstown, N.J.

[21] Appl. No.: 968,945

[22] Filed: Oct. 29, 1992

[51] Int. Cl.$^5$ .............................. C08L 91/00
[52] U.S. Cl. ........................ 106/244; 106/243; 106/266; 106/270; 106/271; 252/315.1; 252/319; 252/351; 252/358
[58] Field of Search ............... 106/243, 244, 266, 270, 106/271, 272; 252/351, 358, 315.1, 319

[56] References Cited

U.S. PATENT DOCUMENTS

| | | | |
|---|---|---|---|
| 4,999,132 | 3/1991 | Canestri | 252/356 |
| 5,070,119 | 12/1991 | Nugent, Jr. et al. | 523/179 |
| 5,108,832 | 4/1992 | Nugent, Jr. et al. | 428/304.4 |
| 5,124,367 | 6/1992 | Barker et al. | 521/107 |

OTHER PUBLICATIONS

1981 Annual book of ASTM standards, part 29 entitled Paint–Fatty oils and Acids, Solvents, Miscellaneous, Aromatic Hydrocarbons, Naval stores, pp. 129–130, published by the American Society for Testing and Materials.

Technical Bulletin 100 entitled Urethanes, Castor Oil, Chemical Derivatives, cover page and p. 1, copyrighted 1982 by CasChem Inc.

*Primary Examiner*—Anthony Green
*Attorney, Agent, or Firm*—Michael J. Cronin

[57] ABSTRACT

A theological additive especially for liquid organic systems containing a castor-oil derivative with hydroxyl values below that appearing in nature. The additive may also contain clays and other extenders. The preferred derivative is castor wax. The additive largely eliminates the long term problem of seeding exhibited by paints and coatings using castor-oil derived additives while simultaneously providing improved dispersability and viscosity modifying qualities.

9 Claims, 2 Drawing Sheets

RHEOLOGICAL ADDITIVE COMPRISING DERIVATIVES OF CASTOR OIL

The present invention relates to a theological additive for use in modifying the viscosity and other properties of liquid organic and solvent base systems.

BACKGROUND OF THE INVENTION

Paints and coatings require the addition of theological additives to prevent the settling of pigments during long periods of storage and to provide leveling and anti-sag properties. Such additives are also utilized to change the viscosity of paints and coatings by thickening or thinning such systems and to impart various other known theological properties. The faster and easier the dispersion characteristics of such additives the better.

It has been known for some time that castor products derived from the castor bean plant and oil obtained from the bean can be formed into a large variety of derivatives; one such example is castor wax. The molecular structure of castor oil permits the creation of a large number of new chemical products by innumerable and various reactions. Many of these derivatives, in combination with extenders, function as excellent theological additives, particularly in aliphatic, enamel and alkyl paint systems. Extenders employed with castor based rheological additives include smectite clays, talcs, aluminum silicate, calcium carbonate, attaplugite clay and various other compositions.

Bentonite and hectorite clays are particularly useful as extenders as are silicates and silica. Extenders are usually present in a range of about 20% to about 80% by weight of the mixture.

A very useful derivative of castor oil for theological additives has proved to be castor wax. U.S. Pat. No. 3,252,820 describes a theological composition containing a thixtrophic wax derived from glyceryl trihydroxystearate, the hydrogenated form of castor oil. Rheox, Inc. offers for sale as a commercial product a theological additive designated THIXCIN R which is based on a castor wax. Rheox also offers for sale products utilizing castor wax and extenders such as clay and aluminum silicate.

Castorwax is a synthetic, waxlike compound obtained by the controlled hydrogenation of natural castor oil. The principal constituent as mentioned above is the glyceride of 12-hydroxystearic acid. There are also present minor quantities of mixed glycerides of this acid and dihydroxystearic and stearic acids.

Castorwax is hard and brittle, and has a high melting point. It is practically odorless (faint fatty or waxy odor) and is tasteless. It can be supplied in the form of uniform, free-flowing, white flakes. The color of sol id castorwax is cream to pearly by reflected light and bluish-white by natural light. When molten it is clear, transparent, very fluid, and largely colorless.

Solid castorwax has an amorphous fracture. It is normally uniform in composition and free from extraneous matter.

Castorwax is relatively non-toxic; it can be considered as having a toxicity on the order of linseed or vegetable oils. Castorwax is extremely hard in comparison with most other waxes. Its penetration value (Penetrometer Needle No. 14 with 100 grams weight) is 0.2 mm as compared with a value of 0.1 for carnauba wax and 1.7 for beeswax.

Castorwax is highly miscible with abietyl alcohol, hydro-abietyl alcohols, chlorinated aromatics, ethyl cellulose, rosin, cellulose acetate butyrate, and polybutyl and polyisobutyl methacrylates. It is moderately miscible with ester gums and coumarone indene resins.

A notable property of castorwax is its relative insolubility in most liquid organic systems at moderate temperatures. Castorwax will dissolve in a number of solvents and oils at elevated temperatures with these solutions on cooling forming gels or paste-like masses.

When castorwax is subjected to elevated temperatures for sustained periods of time it undergoes heat deterioration, so that on cooling, the original wax is found degraded to a stiff paste and eventually, on reheating, to a brown grease.

In addition to fully hydrogenated or regular castorwax, there are also available a series of partially hydrogenated castor oils of intermediate melting points which are wax-like. These waxes of lower melting point may differ in composition from regular castorwax by containing lower percentages of glyceryl trihydroxystearate. As the content of this saturated fatty acid glyceride is reduced, there is a corresponding lowering of the melting point of the product.

Partially hydrogenated castor waxes are slightly more compatible and soluble than fully hydrogenated castorwax. They have utility in those applications where some sacrifice in melting point and hardness can be tolerated to achieve better compatibility and solubility, or where a lower melting point is desired.

Seeding problems have plagued systems using theological additives comprised of castorwax from the very beginning and scientists and technicians have long searched without success for a seed resistant castor product to use as a rheological additive. Seeding occurs because of the forming of colloidal particles in paint containing castor wax products. These colloidal particles result from either solvent-swollen but not properly dispersed grains of castor wax (caused by low heat of activation) or by the precipitation of dissolved wax (caused by overheating). Paint left standing often shows both an increase in the number of such particles and an increase in their size. Paint also may demonstrate such seeding immediately after manufacture.

Seeding is undesirable because such large particles present unpleasant visual qualities after paint and coatings have been applied to a surface. In addition their existance make such application more difficult and time consuming. Attempts to reduce seeding by physically modifying castor derivatives are described in U.S. Pat. No. 3,203,820.

The molecular structure of natural castor oil is a triglyeride with three pendant carbon chains. Generally, each carbon has a double bond at the 9,10 position and a hydroxyl group on the 12th carbon. Castor oil in nature has a hydroxyl value of approximately 160-165 with a fatty acid distribution of approximately 89% $C_{18}OH$ and 9% $C_{18}$; that is, not all the carbon chain lengths in natural or untreated castor oil contain an OH group; only about 90% of said chains on average do so. The various components are described in Table 1.

TABLE 1
COMPONENTS OF CASTOR OIL

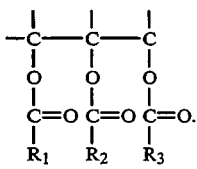

where approximately 2% of $R_i = C_{15}$, 98% = $C_{17}$;
88% of $R_j$ has OH in the 12 position and a double bond in the 9,10 position;
10% of $R_j$ has no OH, but may or may not have a double bond in the 9,10 position;
and $R_j = R_1$ and/or $R_2$ and/or $R_3$
The hydrogens are not shown.

Castor wax can be produced from castor oil by hydrogenation, see FIG. 1, and can be described as essentially a hydrogenated molecule having no appreciable change in hydroxyl value versus the natural hydroxyl value of castor oil from which it was made. Castor oil has a natural hydroxyl value in the range of 160–168. Hydrogenation can be accomplished by many known methods and can occur as part of or distinct from other reactions involving castor oil, for example sulfonation (a reaction of castor oil with sulfuric acid) and dehydration. Hydrogenation can be partial or substantially complete as described above.

SUMMARY OF THE INVENTION

We have unexpectedly discovered a new improved castor-wax like product that yields products which display improved theological performance in organic systems as well as greatly enhanced resistance to seeding which is described below.

An altered castorwax of a reduced hydroxyl content can be produced commercially by partially dehydrating castor oil either before, after or during hydrogenation or by blending castor derived components, one or more of said components having a reduced hydroxyl content. We call this product rheowax or "low hydroxyl castor-wax".

Processes of dehydrating castor oil are well known. See for example Government of India Patent No. 137,507; see also, *A Continous Process for the Dehydration of Castor Oil*, The Journal of the American Oil Chemists Society, August 1948 at pages 268–271. Other castorwax synthesis procedures described in the literature indicate that varying processing parameters such as hydrogen pressure, dosage of fresh nickel catalyst, temperature and reaction time employed during hydrogenation of castor oil can influence castorwax hydroxyl value to yield the compositions of this invention.

UTILITY OF THE INVENTION

The low hydroxyl value product of this invention is employed primarily as a theological additive for oil and solvent-based paints, coatings, films, cosmetics and other organic fluid systems. The additives of this invention provide efficient theological performance as to viscosity and flow control in addition to enhanced seeding resistance.

Low hydroxyl castorwax, for example, is significantly less prone to seeding when processed or stored at excessively high temperatures. This property considerably reduces the likelihood that a batch of product thickened with the additives of this invention would require reprocessing due to seed formation and resulting loss of grind and efficiency.

Utilization of low hydroxyl castorwax as a rheological additive displays greatly enhanced resistance to seeding. Such additives can be employed as a direct replacement for castorwax in various solvent-based formulations and in rheological additives in which castorwax is a component.

Experimental activity for establishing an optimum range of hydroxyl values for generating a product with efficient rheological performance and enhanced seeding resistance is currently proceeding. It has been found that a relatively modest reduction in hydroxyl value from approximately 160–165 to 146–153, yielded products which significantly resisted seeding. A larger reduction in hydroxyl content, in which the percentage of $C_{18}OH$ was reduced from 89.5% to 66%, yielded highly efficient rheological performance with resistance to seeding after storage at 200° F. in aliphatic test paint. Percentage of $C_{18}OH$ can be converted to hydroxyl values using known mathematical techniques.

Factors which influence castorwax seeding include paint processing and storage temperatures and solvent KB value. With prior art standard castorwax products, seeding can occur when temperature or KB values outside the recommended ranges are employed.

It is postulated that lowering the hydroxyl value of our low hydroxyl castorwax within fairly large ranges will work to reduce seeding although at very low levels such reduction may be diminished and the other rheological properties of the additive effected.

DESCRIPTION OF THE PREFERRED EMBODIMENTS

Figure 1:
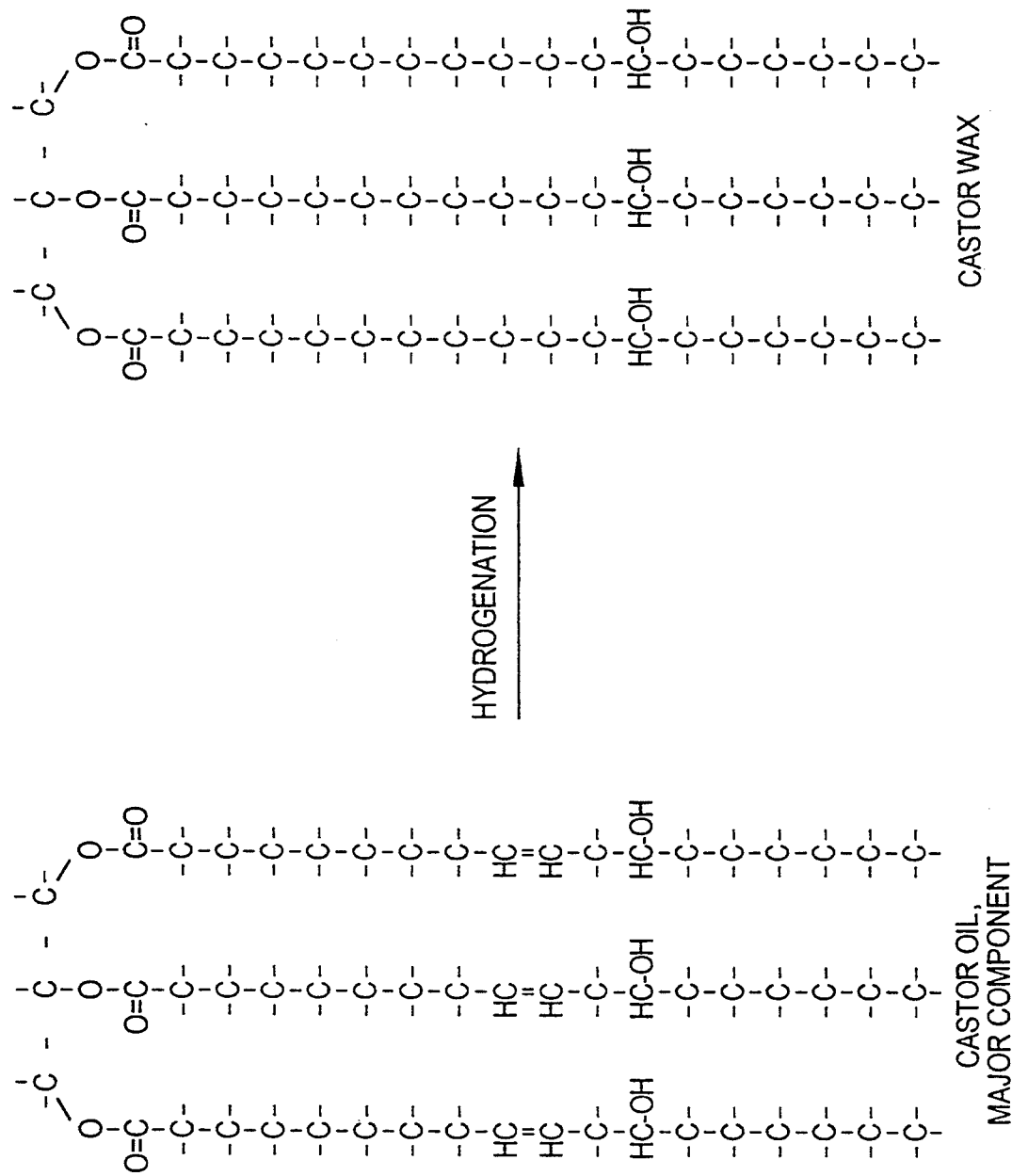
FIG. 1 shows the change in the castor oil molecule brought about by hydrogenation.
Figure 2:
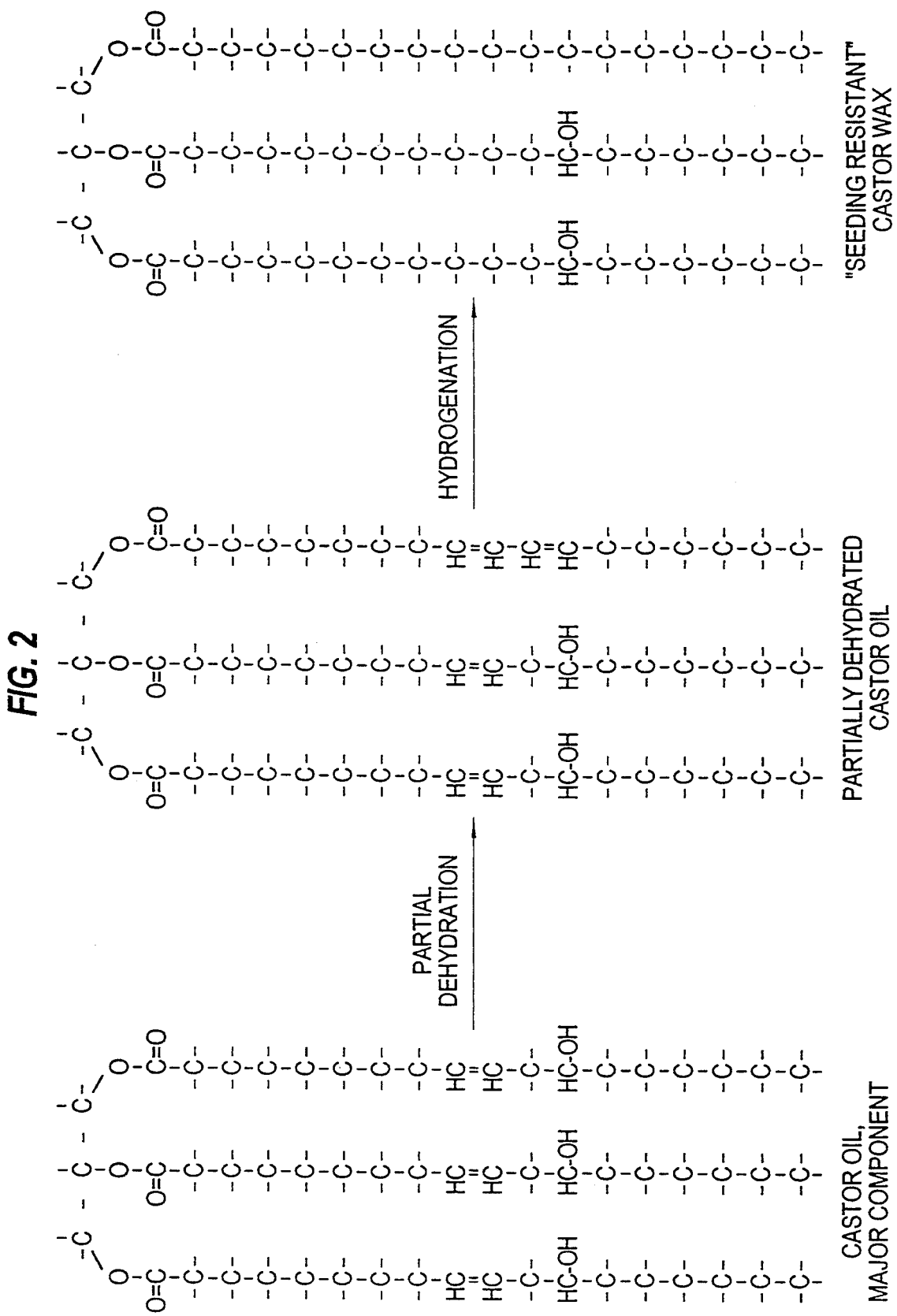
FIG. 2 shows the change in the castor oil molecule brought about by dehydration and hydrogenation.

One very general way of explaining a representative process of making our seed resistant castor product is shown in FIG. 2 detailing how castor oil can be dehydrated in part to remove some OH groups from one or more of the carbon chains. It should be understood that such removal involves many molecular structures of the type shown in FIG. 2 and such lowering of hydroxyl level can occur with a large variety of various lower levels from natural castor oil. It is also to be understood that dehydration can occur other ways including after, before and during hydrogenation and can involve a large variety of different processes.

Blending of castor components having different hydroxyl values is another way of achieving a lowered hydrogenated castor oil derivative. For example, to achieve a hydroxyl value of 120, one can mix 50 parts of prior art castor wax having a hydroxyl value of 160, with 50 parts of low hydroxyl castor wax having a hydroxyl value of 80.

EXAMPLES

In order to more completely describe our discovery, the following examples are given.

EXAMPLE 1

This example describes how two different fractions of castorwax were obtained.

A 5% loading of THIXCIN R (100% castorwax made from natural castor oil) in mineral spirits was heated to 50° C. with Cowles dispersator mixing and held at 50° C. for 15 minutes. The material was then vacuum filtered using a Buchner funnel fitted with a 934-AH glass filter to separate the soluble material from the insoluble solids. The insoluble solids were washed two additional times with fresh mineral spirits at 50° C. The soluble material obtained from the additional washings was combined with the initial soluble fraction. The combined soluble fractions were taken to dryness on the steam bath, redissolved in mineral spirits at 50° C. and any insoluble material removed by filtration. The resulting soluble fraction was taken to dryness on the steam bath and the insoluble solids fraction was dried in a 75° C. vacuum oven. After drying, the two fractions were frozen with liquid nitrogen and ground in a centrifugal mill fitted with a 0.5 mm screen. For comparison, a portion of THIXCIN R was also ground using the 0.5 mm screen.

EXAMPLE 2

This example demonstrates the compositional differences between the THIXCIN R soluble and insoluble fractions isolated from mineral spirits heated at 50° C. and compared to standard THIXCIN R. Soluble fractions have a reduced or lowered hydroxyl value.

The THIXCIN R fractions and the Standard THIXCIN R described in Example 1 were evaluated for fatty acid distribution by gas chromatography. In the analysis, the samples were saponified with methanolic sodium hydroxide, converted to methyl esters with boron trifluoride methanol and then the methyl esters were separated on a gas chromatographic column, identified by use of reference compounds and quantitated by integrated peak areas relative to an internal standard. The samples of Example 1 were also analyzed for melting point. Data are presented in Table 2.

TABLE 2

| Sample | Melting Point. C. | G.C. Fatty Acid Distribution | | | |
|---|---|---|---|---|---|
| | | % $C_{16}$ | % $C_{18}$ | % Unknown | % $C_{18}OH$ |
| Soluble in Mineral Spirits at 50° C. | 68.5–72.5 | 3.0 | 27 | 4.4 | 66 |
| Insoluble in Mineral Spirits at 50° C. | 89–90 | 0.3 | 2.0 | 1.8 | 96 |
| Standard THIX- | 84.5–87 | 1.0 | 8.6 | 1.8 | 89 |

TABLE 2-continued

| Sample | Melting Point. C. | G.C. Fatty Acid Distribution | | | |
|---|---|---|---|---|---|
| | | % $C_{16}$ | % $C_{18}$ | % Unknown | % $C_{18}OH$ |
| CIN R | | | | | |

EXAMPLE 3

This example demonstrates the differences in paint rheological performance and seeding resistance between the THIXCIN R fraction soluble in mineral spirits at 50° C., the fraction insoluble in mineral spirits at 50° C. and Standard THIXCIN R.

The THIXCIN R fractions and Standard THIXCIN R described in Example 1 were employed at an equal loading of 7 pounds per 100 gallons in an aliphatic test paint containing exempt mineral spirits as the solvent. The resulting paints were evaluated for fineness of grind, Brookfield viscosity, thixotropic index, KU viscosity, and sag resistance. The paints were also evaluated for seeding resistance at room temperature and 200° F. by measuring 60° gloss. Presence of seeds would be evidenced by a reduction in gloss values due to an increase in diffuse reflectance of light caused by the seeds. Data presented in Table 3 indicated that the fraction soluble in mineral spirits at 50° C. yielded both significantly better paint viscosity performance and seeding resistance compared to both the insoluble fraction and Standard THIXCIN R.

TABLE 3

EVALUATION OF PAINT PROPERTIES - THIXCIN R FRACTIONS VERSUS STANDARD THIXCIN R
Paint Properties in T-22907

| | | Brookfield, cps | | | | | | Seed Resistance 60° Gloss 200° F. Oven | | |
|---|---|---|---|---|---|---|---|---|---|---|
| Sample Description | F.O.G. | 10 rpm | 100 rpm | T.I. | KU | SAG | R.T. O/N | O/N | 2 NTS | 6 NTS |
| THIXCIN R Soluble Fraction, Mineral Spirits 50° C. Milled 0.5 mm | 6.5A | 6440 | 2268 | 2.84 | 102 | 10 | 82 | 85 | 86 | 80 |
| THIXCIN R Insoluble Fraction, Mineral Spirits 50° C., Milled 0.5 mm | 0 | 2240 | 1384 | 1.62 | 93 | 7 | 81 | 13 | 35 | 33 |
| Standard Thixcin R, Milled 0.5 mm Screen | 5.00 | 3680 | 1644 | 2.24 | 94 | 9 | 84 | 24 | 62 | 52 |
| Standard THIXCIN R, As Received | 6.5A | 3440 | 1624 | 2.12 | 96 | 9 | 84 | 31 | 82 | 83 |

EXAMPLE 4

A sample of low hydroxyl castorwax was specifically produced with its hydroxyl value in the range of 146 to 153. This low OH value sample was blended (or extended) with aluminium silicate to make a rheological additive.

Two paints were made, one using this sample and the second using a standard prior art castor wax additive (that is, one whose hydroxyl value had not been altered). Each batch was sampled at different temperatures to test for seeding. The results presented in Table 4 demonstrate the improvement of the present invention.

TABLE 4

|  | Lowered hydroxyl value sample —OH value 146–153 | | Control castorwax —OH value 160–165 | |
| --- | --- | --- | --- | --- |
|  | Initial | Five Months in Can | Initial | Five Months in Can |
| 130° F. | Pass | Pass | Pass | Pass |
| 140° F. | Pass | Pass | Pass | Pass |
| 150° F. | Pass | Pass | Pass | Pass |
| 160° F. | Pass | Pass | Seeded | Seeded |

The invention being thus described, it will be apparent that the same may be varied in numerous ways. Such variations are not to be considered a departure from the spirit of our invention and such modifications are to be included within the scope of the claims that follow.

We claim:

1. A rheological additive with improved anti-seeding properties comprising a hydrogenated castor oil derivative produced from castor oil having a hydroxyl value of 160 to 168 by a process comprising the steps performed in either order or simultaneously of
   a) hydrogenating said castor oil, and
   b) dehydrating said castor oil so that it has a lowered hydroxyl value.

2. The theological additive of claim 1 wherein the castor oil derivative is a castor wax.

3. The theological additive of claim 1 which includes an extender in an amount of about 20% to about 80% of the total weight of the additive.

4. The rheological additive of claim 3, wherein the extender is selected from the group consisting of bentonite clay, aluminum silicate, calcium carbonate and silica.

5. A liquid organic system containing a rheological additive in an amount effective to provide rheological properties comprising a hydrogenated dehydrated castor-oil derivative produced from castor oil with a hydroxyl value of 160 to 168.

6. The liquid organic system of claim 5 where said system is paint.

7. A rheological additive for liquid organic systems consisting of a lowered hydroxyl value castor wax made from hydrogenated castor oil having a hydroxyl value of 160 to 168 by dehydration.

8. A process of manufacturing a rheological additive for liquid organic systems by producing a castor oil derivative from castor oil with a hydroxyl value of 160 to 168 by a process comprising the steps performed in either order or simultaneously of:
   a) hydrogenating said castor oil, and
   b) dehydrating said castor oil so that it has a lowered hydroxyl value.

9. A process of providing improved anti-seeding rheological properties to a liquid organic system comprising adding to said system a hydrogenated lowered hydroxyl value castor wax in an amount effective to provide rheological properties.

* * * * *

UNITED STATES PATENT AND TRADEMARK OFFICE
CERTIFICATE OF CORRECTION

PATENT NO. : 5,340,390
DATED : August 23, 1994
INVENTOR(S) : Magauran, et al.

It is certified that error appears in the above-indentified patent and that said Letters Patent is hereby corrected as shown below:

Title page, Abstract, delete "theological" and insert "rheological".
Column 1, line 5, delete "theological" and insert "rheological".
Column 1, line 10, delete "theological" and insert "rheological".
Column 1, line 16, delete "theological" and insert "rheological".
Column 1, line 41, delete "theological" and insert "rheological".
Column 1, line 55, delete "sol id" and insert "solid".
Column 2, line 54, delete "existance" and insert "existence".
Column 3, line 61, delete "theological" and insert "rheological".
Column 3, line 64, delete "theological" and insert "rheological".
Column 7, line 31, delete "theological" and insert "rheological".
Column 8, line 1, delete "theological" and insert "rheological".

Signed and Sealed this

Fifteenth Day of November, 1994

Attest:

BRUCE LEHMAN

Attesting Officer

Commissioner of Patents and Trademarks